Nov. 23, 1926.                                                         1,608,077
                          H. WIESER, JR
                          ANTISKID TIRE
                        Filed May 11, 1925

Inventor
Heinrich Wieser, Junior
by
Attorney

Patented Nov. 23, 1926.

1,608,077

UNITED STATES PATENT OFFICE.

HEINRICH WIESER, JR., OF MUNICH, GERMANY.

ANTISKID TIRE.

Application filed May 11, 1925, Serial No. 29,415, and in Germany October 3, 1924.

The present invention has reference to improvements in antiskid tires for bicycles and motorcycles, and relates more specifically to a new formation of tread to be used in connection with a single tube type of tire or with a closed tube and casing type, and the particular object of the invention is to provide a tire tread which will effectively hold the wheel on the ground without side-slipping, whether in the relative vertical position when running straight ahead, or in angularly inclined or tilted position when negotiating curves.

Figure 1:
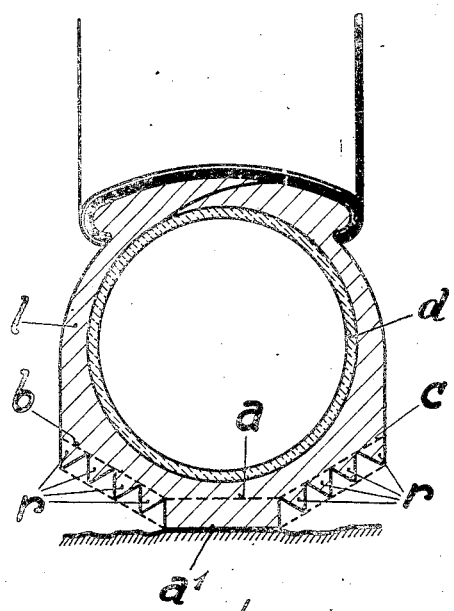
Figure 2:
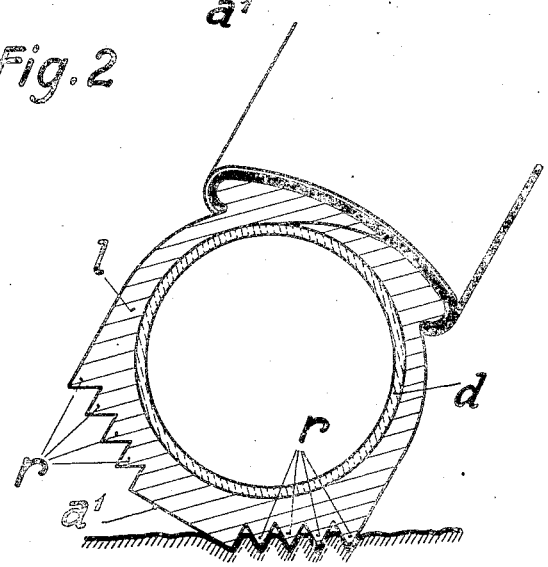

My invention will readily be understood when described in connection with the accompanying drawing, in which Fig. 1 is a more or less diagrammatic vertical section through a constructional embodiment, with the wheel in relative vertical position; Fig. 2 is a similar section with the wheel tilted over when going around a curve.

Before going into the detailed description of the figures I want to make it clear that my invention is susceptible of various constructional embodiments and is by no means restricted to the specific form shown and in connection with a two-part tire, comprising the casing or shoe 1 and the inner closed tube d.

The tubular casing 1 presents three merging annular basal tread zones or strips a, b and c relatively angularly extending as shown in Fig. 1. From the lateral tread bases b and c extend radially directed antiskid members r of preferably triangular cross-section, forming parallel annular corrugations, whilst the middle zone a is solidly extended to form a comparatively wide flat tread annulus a'. Care must be taken in this arrangement that the outermost points of the members r all extend in the same plane in each zone, as shown by dotted outline in Fig. 1.

The effect of the described tire structure is as follows:—Upon the tire moving in normal vertical position over a road surface such as presented by most of the country roads, be it dry, sandy and yielding, or moisture-softened and slippery, the solid middle tread zone a' flatly contacts with the road and affords by reason of its relative width a good purchase thereon, yet absorbs but little of the motive power as it prevents the tire from sinking unduly deep into the road surface. When going around a curve and the wheel tilts over to the right, (as shown in Fig. 2) or to the left, as the case may be, then the corrugations r at once are brought into contact with the road surface and rollingly bite into it so that slipping is effectively prevented.

On running perpendicularly over the ordinary road hazards, such as rail crossings, depressions, soft spots, rills, and the like, the lateral antiskid annuli or corrugations cooperate with the flat middle tread zone in negotiating these obstacles to hold the wheel to its course.

What I claim is:—

An anti-skid tire structure of the character set forth comprising a tubular member having a circular inner wall forming a correspondingly shaped bore and an outer wall provided with flat side faces diverging outwardly beyond the central transverse line of the bore to provide a tread portion of greater width than the diameter of the remainder of the tubular member, said flat side faces terminating at their outer edges on a transverse line substantially coincident with the outer periphery of the outer wall of the bore, and said tread portion presenting a middle tread surface having transversely flat tread strips and two lateral tread surfaces disposed at oblique angles to said middle tread surface, each lateral tread surface having a series of annular concentric corrugations projecting therefrom between the lateral margins of the middle tread strips and outer edge of the flat side face at the adjacent side of the tire, said corrugations being of substantially prismatic shape and the bases and apices of each series of corrugations lying in straight parallel inner and outer planes, both oblique to the middle tread strips, the said outer edges of the flat side faces merging into the outer corrugations of the respective series and the oblique planes of the apices of the corrugations coinciding with and intersecting the outer corners of the tread strips of said transversely flat middle tread surface.

In testimony whereof I affix my signature.

HEINRICH WIESER, Jr.